July 27, 1926.

G. C. THOMAS, JR 1,594,223

CABLE CONNECTER

Filed Jan. 22, 1924

Inventor

George C. Thomas, Jr.

By Attorneys

Bohleber + Ledbetter

Patented July 27, 1926.

1,594,223

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,783.

This invention relates to improvements in cable connecters employed in anchoring electric cable and conduit to fixture boxes such as outlet boxes, cable boxes and others.

The primary object of the invention is to so simplify and improve the construction of cable connecters that they may be economically produced and embody a small amount of material. Likewise it is an object to produce a connecter which may be stamped from sheet material and embody means for covering the exposed portion of a box knock-out hole existing after the cable is inserted therein.

The accompanying drawing shows examples of the invention serving to illustrate the connecter structure and showing how it is assembled with a box and cable to perform the functions desired. The invention is capable of certain modifications without departing from the scope of the invention as will be appreciated by those skilled in the art.

Figure 1:
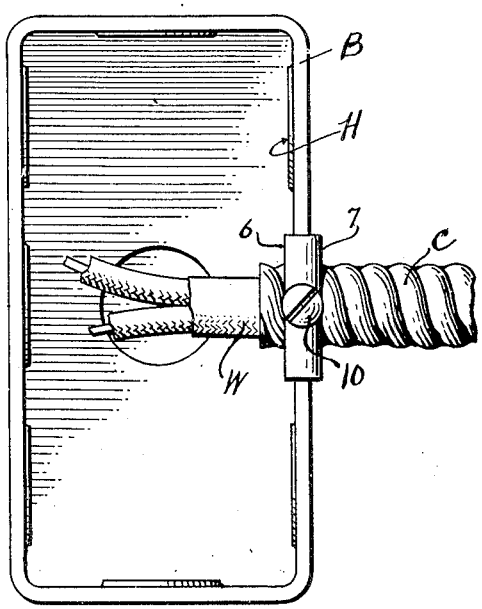
Figure 1 illustrates a top open view of the connecter assembled with a box and cable.
Figure 2:
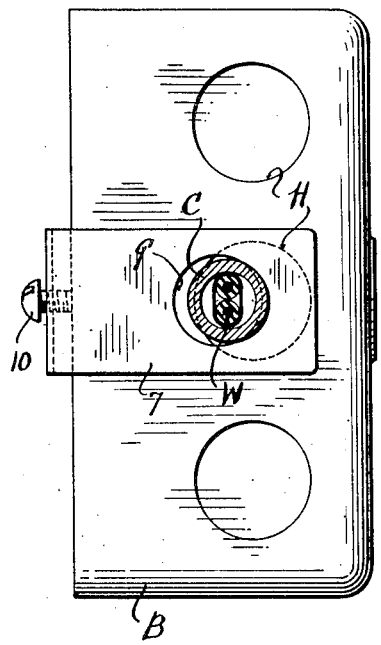
Figure 2 shows an outside projection thereof.

Having further reference to the drawings, it is understood by those conversant with the art that the typical electrical fixture box such as the outlet box B is made with partly punched knock-out openings H, the discs of which are knocked out by the mechanic at the time the cable C with wire W is inserted in the box; and heretofore it has been necessary for the manufacturer to provide more or less expensive means for securely anchoring the cable to the box.

The improved connecter itself consists of a simple sheet metal stamping in the form of a U-shaped flat part bent centrally to provide parallel plates or legs 6 and 7, and the lower ends 8 act as cover means by which the box hole H is adequately covered or sealed when the parts are assembled. A cable receiving hole 9 is made in each leg 6 and 7 and placed above the cover plate ends 8. The punched apertures 9 are preferably substantially near the same size as the diameter of the cable C, in order that the cable be inserted through the side apertures and passed to the inside of the box B. The U-shaped connecter carries a draw or pressure screw 10 screw threaded into the central portion of the part 6—7 at the point where the legs are bent downwardly; and the said screw projects down into the said legs leaving the head thereof exposed on top for the convenient manipulation of the mechanic assembling the parts.

In fastening the cable to the box, the said connecter is placed astride the box wall B with the screw turned outwardly thereby enabling the holes 9 to drop down into position co-extensive with the box knock-out opening H. The cable is now started through the box and connecter whereupon the screw 10 is turned downwardly and seated against the edge or rim of the box. The screw serves to raise the connecter upwardly with great force, bringing the edge of the box knock-out into tight engagement with the cable thereby pressing the cable against the edge of the knock-out opening H, as well as causing the sharp edges of the cable connecter holes 9 to be pressed into the cable. In this manner the cable is embraced and gripped very tightly between the three parts, namely, the edge of the box hole H and the two legs 6 and 7 of the connecter.

Furthermore it is observed how the cable C is not pinched or clamped at any one particular place, but the clamping and pinching action of the three parts is well distributed circumferentially around the cable wall due to the fact that the arcuate edge of the opening H, as well as the round edges of the connecter holes 9, bear or press circumferentially around cable wall so distributing the strain and pressure about the cable that no danger exists as respects crushing or damaging it.

Figure 4:
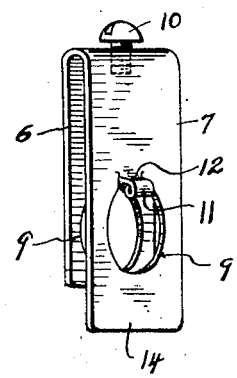
Figure 4 shows a perspective view of a connecter removed from the box and cable, and serves as well to illustrate a modified form of the invention.

Figure 4 shows a slightly modified form of the invention constituting one of the improvements, and which may be used in connection with the plain simple stamping just described if the manufacturer so desires. The connecter 6—7 is made with a punched out ear or struck up part 12, the outer edge of which is preferably curled as at 11 to form a cable stop or rest. The curl 11 is spaced just far enough from the face of the leg or plate 7 as will permit the cable end to be inserted the proper distance into the box, whereupon the end edge of the cable abuts against the stop 11 to prevent the cable from being projected too far into the box. It will be observed that the ear 12 and stop 11 are formed up from the material punched from the hole 9, and that the curl is formed up during the punching and forming operation consequent to the manufacture of the device.

It is observed how in Figure 4, the stamping further economizes in material or stock for the leg 6 thereof may be made shorter than the leg 7 or vice versa, because of the fact that the single cover plate 14 is considered sufficient in most cases to cover the box knock-out opening H. While for clarity in illustration an assembly view of the drawing might indicate that the box opening H is not positively sealed, the fact remains that the connecter is so manufactured that the longer plate 7—14 tightly abuts the face of the box and seals over the box cable opening thus enabling the connecter to be made of a minimum amount of stock.

Figure 3:
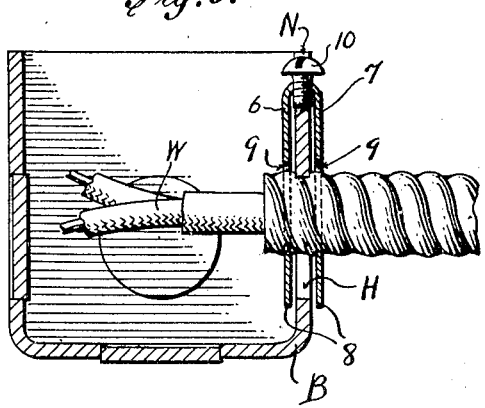
Figure 3 illustrates a cross sectional view of a modified form of box and connecter combination.

In some instances it is preferred to make the box B with a notch N and I have illustrated this as an alternate form in Figure 3. This construction lowers the screw 10 into the box wall until it is below the level of the top edge of the box thereby enabling the mechanic to place a cover over the box to effectively seal in the parts.

What I claim is:

1. In combination, an electrical fixture box having the usual form of opening to receive cable, a U-shaped connecter disposed astride the box wall and over the edge thereof and provided with openings through which a cable is inserted and pressed, and means bearing on the edge of the box and drawing on the connecter to force said connecter into tight engagement with a cable and to force said cable against the box opening.

2. In combination, an electrical fixture box having the usual form of opening to receive cable, a U-shaped connecter disposed astride the box wall and over the edge thereof and provided with cable holes through which a cable extends to the inside of the box, and a screw cooperating with the box edge and U-shaped connecter to pinch the cable into the opening edge and against the edges of the connecter holes.

3. In combination, an electrical fixture box having the usual form of opening to receive cable through the box wall, a flat stamping bent centrally over the edge of the box with its ends lapping over the opening to close the box hole, said ends provided with a hole to receive cable and hold said cable on the inside and outside of the box adjacent the box opening and means for forcibly moving the connecter relatively to the box to clamp against the cable.

4. In combination, an electrical fixture box having the usual form of opening to receive cable through the box wall, a flat stamping bent centrally over the edge of the box with its ends lapping over the opening to close the box hole, said ends provided with an aperture to receive cable and embrace it circumferentially at a point on the inside and outside of the box adjacent the box opening, means for forcibly moving the said ends relatively to the box to pinch against a cable, and a struck up ear formed on one connecter ed at the rim of the aperture acting as a stop against which a cable end rests.

5. A cable connecter embodying a stamping provided with a hole through which a cable is passed, said stamping bent to bring the ends thereof into closely spaced parallel relation, and means to react between the bent portion and a box edge to move the connecter.

6. A cable connecter embodying a flat stamping with a hole punched in each end through which a cable is passed, said stamping bent to bring the ends thereof into closely spaced parallel relation, and a screw mounted on the connecter at the bend to engage and bear against a box edge to move said connecter.

7. A cable connecter embodying a flat stamping with a hole punched in each end through which a cable is passed, said stamping bent centrally to bring the ends thereof into closely spaced parallel relation, means to react between the bent portion and a box edge to move the connecter, and a struck up lip punched from the connecter and standing outwardly from the stamping.

8. A cable connecter embodying a flat stamping with a hole punched in each end through which a cable is passed, said stamping bent centrally to bring the ends thereof into closely spaced parallel relation, a screw mounted on the connecter at the bend to engage and bear against a box edge to move said connector, and a struck-out lip punched from one end of the stamping.

9. A cable connecter embodying a flat stamping with a hole punched substantially near each end thereof spaced back from the end so as to include a cover plate on each end, said stamping bent substantially centrally to bring the cover plates into close parallel relation and the holes into axial alignment, and means to react between the central bent portion and a box edge.

10. A cable connecter embodying a flat stamping with a hole punched substantially near each end thereof spaced back from the end so as to include a cover plate on the end, said stamping bent centrally to bring the cover plates into close parallel relation and the holes into axial alignment, and a screw carried by the connecter at the centrally bent portion to engage and bear against a box edge to move the connecter.

11. A cable connecter comprising a U-shaped part embodying closely spaced parallel legs having cable openings which surround and engage a cable, a cover plate included in a part of the leg, and a screw carried by the connecter projecting down between the parallel legs.

12. A cable connecter embodying a flat stamping with a hole punched substantially near each end thereof, a box hole cover plate included on an end of the stamping, said stamping bent to bring the said cover plate beyond the other end of the stamping into close parallel relation therewith and the holes into axial alignment, and a screw carried by the connecter at the bend to bear against a box edge to move the connecter.

13. A cable connecter embodying a flat stamping with a hole punched substantially near each end thereof, a box hole cover plate included on an end adjacent the hole, said stamping bent to bring the ends thereof into closely spaced parallel relation, and operating means placed at the bend and in between the bent ends to react between the connecter and the edge of a box to move the connecter.

14. A cable connecter as defined in claim 13 wherein the operating means is a screw, and a cable stop ear is struck up from the plate adjacent the hole.

In testimony whereof I affix my signature.

GEORGE C. THOMAS, Jr.